US010731086B2

(12) United States Patent
Marchant et al.

(10) Patent No.: US 10,731,086 B2
(45) Date of Patent: Aug. 4, 2020

(54) RISER SEPARATION SYSTEM

(71) Applicant: Technip Process Technology, Inc., Houston, TX (US)

(72) Inventors: Paul Marchant, Katy, TX (US); Raj Kanwar Singh, Houston, TX (US)

(73) Assignee: Technip Process Technology, Inc., Houston, TX (US)

( * ) Notice: Subject to any disclaimer, the term of this patent is extended or adjusted under 35 U.S.C. 154(b) by 477 days.

(21) Appl. No.: 15/417,322

(22) Filed: Jan. 27, 2017

(65) Prior Publication Data

US 2018/0216012 A1  Aug. 2, 2018

(51) Int. Cl.
| | | |
|---|---|---|
| *C10G 11/18* | (2006.01) | |
| *B01D 45/08* | (2006.01) | |
| *B01J 8/18* | (2006.01) | |
| *B01J 8/00* | (2006.01) | |
| *B01D 45/06* | (2006.01) | |

(52) U.S. Cl.
CPC ............. *C10G 11/18* (2013.01); *B01D 45/06* (2013.01); *B01D 45/08* (2013.01); *B01J 8/0055* (2013.01); *B01J 8/0065* (2013.01); *B01J 8/1872* (2013.01)

(58) Field of Classification Search
CPC ....... C10G 11/18; B01J 8/1872; B01J 8/0065; B01J 8/0055; B01D 45/08; B01D 45/06
See application file for complete search history.

(56) References Cited

U.S. PATENT DOCUMENTS

| | | | |
|---|---|---|---|
| 4,070,159 A | 1/1978 | Myers et al. | |
| 4,404,095 A | 9/1983 | Haddad et al. | |
| 4,433,984 A | 2/1984 | Gartside et al. | |
| 4,664,888 A | 5/1987 | Castagnos, Jr. | |
| 4,749,471 A | 4/1988 | Haddad et al. | |
| 4,756,886 A | 7/1988 | Pfeiffer et al. | |
| 5,039,397 A | 8/1991 | Haddad et al. | |
| 5,182,085 A | 1/1993 | Lomas et al. | |
| 5,259,855 A | 11/1993 | Ross, Jr. et al. | |
| 5,552,120 A | 9/1996 | Sechrist et al. | |
| 5,662,868 A | 9/1997 | Letzsch et al. | |
| 6,296,812 B1 * | 10/2001 | Gauthier ............... | B01D 45/12 422/144 |
| 7,799,285 B2 * | 9/2010 | Huziwara ............... | B01J 8/18 202/239 |
| 8,747,654 B2 * | 6/2014 | Ulas Acikgoz ........ | C10G 11/18 203/42 |
| 2015/0298037 A1 | 10/2015 | Pretz et al. | |

OTHER PUBLICATIONS

International Search Report and Written Opinion of the Searching Authority dated Apr. 23, 2018 from corresponding International Application No. PCT/US18/14976.

* cited by examiner

*Primary Examiner* — Randy Boyer
*Assistant Examiner* — Juan C Valencia
(74) *Attorney, Agent, or Firm* — Locke Lord LLP; Alan B. Clement; Peter J. Fallon (57) ABSTRACT

The present disclosure is directed to an apparatus and a compact riser separation system for separating a gaseous mixture from a stream of particles entering from a central riser reactor used for cracking a hydrocarbon feed with the stream of particles. The apparatus provides improved gas solid separation efficiency and maximize containment of the hydrocarbon and minimize residence time in the separation system and thereby minimizing undesired post riser cracking reactions.

25 Claims, 5 Drawing Sheets

RISER SEPARATION SYSTEM

FIELD OF THE INVENTION

The embodiments disclosed herein relate to any vapor-particulate operations using a high velocity, dilute phase lift line (or riser reactor), such as the Fluid Catalytic Cracking (FCC) process. In such processes there is a need for an improved apparatus for separating the catalyst and vapor phases via a Reaction Termination Device (RTD) at the riser reactor exit. In addition to vapor-solid separation, the RTD should also provide a way to minimize the residence time of the separated vapor to prevent undesired post riser reactor reactions. In the present apparatus the vapor-catalyst mixture is routed through a series of unique contours and chambers providing a smooth flow profile that promote gas solid separation. The separation device also maximizes the containment of the vapor and, due to its very compact design, the vapor residence time reduces within the system. It is also desirable the design addresses the inherent imbalances of flow that can arise in such systems, this is achieved in a novel catalyst separation chamber design that minimizes re-entrainment of separated catalyst.

BACKGROUND OF THE INVENTION

The FCC process has become well-established in the petroleum refining industry for converting low value high boiling range petroleum fractions into high value lower boiling products, especially gasoline, propylene and other light olefins.

In the FCC process finely divided solid catalyst particles promote cracking reactions by providing both the heat for the reaction and the catalytic activity. The finely divided form of the catalyst can be made to behave like a fluid (hence the designation Fluid Catalytic Cracking) and it flows in a closed cycle between a cracking zone (riser reactor) and a separate regeneration zone.

The reaction zone of an FCC unit generally consists of two parts; a riser reactor and an RTD to rapidly separate the catalyst and reaction products. The RTD system is generally housed in a reactor vessel for mechanical considerations, this vessel also contains other devices important for the operation of the process. Once separated from the catalyst, the reaction products are routed away from the vessel to be quenched and split into the desired fractions.

In the riser reactor, hot catalyst comes in contact with liquid oil feed causing it to vaporize and allow the desired gas phase cracking reactions to proceed and various vapor phase hydrocarbon products, as well as solid coke deposits on the catalyst, are formed. At the end of the riser reactor, a rapid separation of catalyst from hydrocarbon product is desirable to control the reaction time to avoid over-cracking the hydrocarbon vapors. Constraining hydrocarbon conversion time to the riser reactor is desirable as this zone is designed to ensure intimate mixing of the vapor and solid catalyst. Once the mixture leaves the riser reactor, less intimate contact can occur in the containment/separation vessel and undesirable thermal cracking reactions can occur which lead to the loss of valuable products and generation of low value by-products. Containing the hydrocarbon vapors within the RTD and routing them as directly as possible out of the system minimizes the residence time at high temperature that results in thermal degradation. It is also desirable to quickly and completely separate the hydrocarbons vapors from the catalyst to end the catalytic cracking reactions. Two stages of vapor-catalyst separation are required to achieve a very high catalyst recovery; the RTD is considered the primary stage of separation, the secondary separation step consists of multiple high-efficiency cyclones. During the primary separation, hydrocarbon vapor is separated from majority of the catalyst and leaves the RTD through a chamber connected directly to the secondary separation step. Separated catalyst flows down another chamber known as a dipleg at the lower end of the primary separator into the stripping bed. As the catalyst flows down the diplegs it entrains hydrocarbon vapor. Catalyst and entrained hydrocarbon leave the RTD and flow into a stripping zone where they are further separated. As the catalyst passes through the stripping zone the hydrocarbon vapor between and inside the particles are removed by counter current flow of stripping steam. Catalyst free of hydrocarbon vapors but fouled with solid hydrocarbon coke leaves the stripping zone and enters the regeneration zone.

The primary separation is performed by an apparatus known to those skilled in the art as a Reaction or Riser Termination Device (RTD) which is located at the outlet of the riser reactor. The primary separator in this case is known as the Riser Separation System (RSS or $RS^2$) and is normally followed by a second stage of separation, which typically comprises of cyclones.

Following primary gas catalyst separation, the catalyst flows into a stripper bed below the RTD, where it is contacted counter currently with stripping gas to remove any remaining volatile hydrocarbons entrained with the catalyst. The hydrocarbon stripped catalyst, typically referred to as spent catalyst, containing solid coke deposits is passed to a catalyst regeneration zone, where the coke is burned off, and the catalyst activity is restored. The regeneration step releases energy and raises the catalyst temperature, after the coke deposits are burnt off, the hot regenerated catalyst flows back into the reaction zone. Hydrocarbon vapor separated from the catalyst, flows to a downstream distillation system for fractionation into several products. The FCC unit comprising of the riser reactor regenerator assembly is self-heat balanced in that heat generated by the burning of coke in the regenerator matches the heat required for feed vaporization and the heat for the cracking reaction.

Prior art riser separation systems typically have at least two separation chambers with accompanying diplegs and at least two circulations chambers for separation of gas and the catalyst material, respective. U.S. Pat. No. 6,296,812 to Gauthier et al. provides an apparatus for separating and stripping a mixture of gas and particles having an envelope comprising separation chambers and circulation chambers distributed in connection with a riser separation system. The upper portion of each separation chamber has an inlet opening communicating with the riser reactor and a middle zone for rotating the mixture in a vertical plane and a lower zone known as dipleg to collect the separated catalyst particles. Each separation chamber comprises two lateral walls which are also walls for the circulation chamber, at least one of the walls of each chamber comprising a lateral outlet opening for mixing gas and particles into the adjacent circulation chamber. The circulation chamber has two additional openings, one at the top connected to an gas outlet tube which further connects to the secondary separator and a lower opening to communicate with the stripper bed below. Application of this apparatus is to fluidized bed catalytic cracking of hydrocarbons in a riser.

The Gauthier et al. device has multiple separation and circulation chambers and each separation chamber has its own dipleg comprising a particle outlet opening communicating below the separation chambers with a stripper bed. In the Gauthier et al. device the riser vapor and catalyst mixture is forced to decelerate and change direction before entering the separating chambers through windows in the riser top taking a one-quarter (¼) turn before separating from each other. The vapor then enters the collection chamber after taking an additional 180° turn underneath the separation chamber's deflector. Catalyst flows down the separating chamber into diplegs, designed for low mass flux to maximize gas disengagement. This device is mainly used as primary separation device for catalyst and vapor for internal riser systems contained within the reactor/stripper vessel. Stripping gas and hydrocarbon vapors entrained from separation chamber diplegs into the reactor, enters the collection chambers through the lower conduit, mixes with the riser vapor from the separation chambers before entering the gas outlet tube/collector and then flows into cyclones—secondary separator for final gas/catalyst separation. The above-discussed system is associated with low catalyst collection efficiencies. The inlet to the separating chamber has a severe 900 turn from the riser top and provides only a ¼ turn for gas and catalyst to separate from each other resulting in low separation efficiency. The 90° change in direction creates a turbulent catalyst flow regime at the inlet and requires time to develop the necessary flow structure to achieve good separation of the cracked gases from solid catalyst particles. There is no connection between the separating chambers creating the potential for uneven pressure distribution resulting in uneven loading to each chamber, thus resulting in low separation efficiency.

Another type of riser separation system, such as, U.S. Pat. No. 4,664,888 to Leonce F. Castagnos, includes a deflecting device. The Castagnos patent is directed to a rough cut catalyst-vapor separator for fluid catalyst cracking risers which is located at the outlet of a riser and causes the oil-catalyst mixture to undergo a tight 180° downward turn. The centrifugal separator is equivalent to one-half a turn inside a cyclone and causes most of the catalyst to move to the wall. Most of the oil vapors are squeezed out away from the wall. At the end of the separator is a shave-off scoop positioned to divide a predominantly catalyst phase from a predominantly oil phase. The shave-off scoops conduct the catalyst phase away from the center of the vessel and deposit it near the vessel wall where its downward flow is continued under the action of gravity. The oil vapor phase continue its downward flow for a while but then must undergo a 180° degree turn and flow upward to exit the vessel through a series of conventional cyclone separators. However, the second 180° turn of the oil vapors can re-entrain the separated catalyst which negates the initial gas solid separation.

Castagnos also discloses an open semi-toroidal deflecting device and the gas/catalyst mixture exiting the riser impinge on the surface of the deflector wherein the catalyst particles are compressed against it and the separated gas phase is supposed to enter an open area below the edge of the deflector. As the gases separate from the particulate phase the solids tend to slow down and the effect of gravity negates the initial separation achieved. Any remaining compressed particulate phase flows onto a collection surface, the particles then flow down and off of the surface towards the wall of the vessel. The separated gases are supposed to flow up the conduits not re-contacting the particulate phase. As such, the pressure below the impingement surface and collection surface is higher than the pressure above them. This pressure differential forces gas not only through the conduits but also through the open area below the edge of the deflector and the collection surface, thus further negating the separation already achieved. Subsequently, the separated gas is "uncontained" in that it enters the vessel and experiences considerable residence time and undergo post riser cracking.

As such, there remains a need within the industry for a riser separation system having improved efficiencies. The present inventors have discovered a method and means to achieve improved catalyst and vapor phase separation, as well as improved gas collection efficiency, utilizing a riser separation system with a novel design providing an improved flow profile that promotes gas solid separation and improves operational stability.

SUMMARY OF THE INVENTION

The embodiments disclosed herein are directed to methods and apparatus for separating a gaseous mixture from a stream of particles entering from a central riser reactor where cracking of hydrocarbon feed takes place with the stream of particles. The apparatus comprises: a reaction vessel (100) comprising a lower stripping bed area (29) and an upper secondary separator area (29a), a central riser reactor (4) including a central riser reactor inlet (26) at one end for receiving the hydrocarbon feed and stream of particles and at least one central riser reactor outlet (5) at an opposite end for evacuating a mixture of cracked gases and solid particles; a separation vessel (1) comprising in an alternating manner at least one separation chamber (2) and at least one collection chamber (3) distributed axially about the central riser reactor (4) and proximate to the central riser reactor outlet (5) for separating the cracked gases and solid particles; each separation chamber (2) comprises two substantially vertical lateral walls (9) which also comprise a wall of the adjacent collection chambers (3), a separation chamber inlet (27) in an upper area of the separation chamber (2a) communicating with the central riser reactor outlet (5) for receiving the cracked gases and solid particles, a separation chamber deflector (8) over which the cracked gases and solid particles pass, the separation chamber deflector (8) being proximate to the separation chamber inlet (27), and at least one of the vertical lateral walls (9) of each chamber comprises a lateral outlet (10) below the separation chamber deflector (8) enabling the cracked gases and a minor portion of the solid particles from the separation chamber (2) to communicate with an adjacent collection chamber (3); each collection chamber (3) comprises a collection chamber outer wall (14) that includes a stripping gas entrance window (15) to allow a stripping gas from at least one stripping gas injector (40) proximate to the lower stripping bed area (29) to enter the collection chamber (3), a collection chamber floor (16) that together with the collection chamber outer wall (14), the vertical lateral walls (9) and the central riser reactor (4) define the collection chamber (3), and at least one collection chamber conduit (17) in an upper area of the collection chamber (3a) for evacuating the cracked gases and a minor portion of the solid particles from the collection chambers (3) to a gas outlet collector (18); each separation chamber (2) further comprises a separation chamber outer wall (11) that extends from the separation chamber inlet (27) towards the lower stripping bed area (29) and together with lateral vertical walls (9) and central riser reactor (4) form a separation chamber outlet (36) at a lower area of the separation chamber (2b) communicating with a common catalyst outlet area (37) positioned toroidally around the central riser reactor (4), the common catalyst outlet area (37) comprises a common catalyst area wall (38), the common catalyst area wall (38) extends towards the lower stripping bed area (29) from the separation chamber outer wall (11) proximate to the separation chamber outlet (36) and collection chamber outer wall (14) and proximate to the collection chamber wall floor (16) circumferentially around the central riser reactor (4) to direct solid particles to the lower stripping bed area (29); the reaction vessel (100) further comprises at least one secondary separator (28) in the upper secondary separator area (29a), communicating with the gas outlet collector (18) for receiving the cracked gases and a minor portion of the solid particles, the secondary separator (28) comprises at least one gas evacuation conduit (32) communicating with a gas collector (33) for discharging cracked gases, the gas collector (33) comprises a gas outlet (35) for evacuating the cracked gases from the reaction vessel (100), and at least one dipleg (30) having a dipleg outlet (31) extending into the lower stripping bed area (29) for returning separated solids to the lower stripping bed area (29) of the reaction vessel (100).

The embodiments disclosed herein are further directed to an apparatus for separating a gaseous mixture from a stream of particles entering from a central riser reactor, a riser reactor where cracking of a hydrocarbon feed takes place with FCC catalyst. The apparatus comprises: a reaction vessel (100) comprising a lower stripping bed area (29), and an upper secondary separator area (29a), a central riser reactor (4) including a central riser reactor inlet (26) at one end for receiving the hydrocarbon feed and stream of particles and at least one central riser reactor outlet (5) at an opposite end for evacuating a mixture of cracked gases and solid particles; a separation vessel (1) comprising in an alternating manner at least one separation chamber (2) and at least one collection chamber (3) distributed axially about the central riser reactor (4) and proximate to the central riser reactor outlet (5) for separating the cracked gases and solid particles; each separation chamber (2) comprises two substantially vertical lateral walls (9) which also comprise a wall of the adjacent collection chambers (3), a separation chamber inlet (27) in an upper area of the separation chamber (2a) communicating with the central riser reactor outlet (5) for receiving the cracked gases and solid particles, a separation chamber deflector (8) arcs away from the longitudinal axis of the central riser reactor (4) towards the lower stripping bed area (29) over which the cracked gases and solid particles pass, the separation chamber deflector (8) being proximate to the separation chamber inlet (27), and at least one of the vertical lateral walls (9) of each chamber comprises a lateral outlet (10) below the separation chamber deflector (8) enabling the cracked gases and a minor portion of the solid particles from the separation chamber (2) to communicate with an adjacent collection chamber (3); said central riser reactor outlet (5) further comprises a riser outlet curved surface (42) that arcs away from the longitudinal axis of the central riser reactor (4) and extends to the separation chamber deflector (8) of each separation chamber (2) to initiate a substantially 180° continuous change in direction of the cracked gases and solid particles evacuating the central riser reactor (4) via the central riser reactor outlet (5) and separation chamber inlet (27) into each separation chamber (2) and a riser outlet cone-shaped concave deflector (20) having a vertex (25) proximal to the center of the central riser reactor outlet (5) and pointing to the central riser reactor inlet (26), starting from the vertex (25) the riser outlet cone-shaped concave deflector (20) arcs away from the longitudinal axis of the central riser reactor (4) extending to and communicating with an upper area (27a) of each separation chamber inlet (27) facilitating the change in direction of the cracked gases and solid particles evacuating the central riser reactor (5); each collection chamber (3) comprises at least one collection chamber conduit (17) in an upper area of the collection chamber (3a) communicating with a gas outlet collector (18) for evacuating the cracked gases and a minor portion of the solid particles from the collection chambers (3), and a collection chamber outer wall (14) that extends from the collection chamber conduit (17) and together with the vertical lateral walls (9) and the central riser reactor (4) define a stripping gas inlet (39) to allow a stripping gas to enter the collection chamber (3) from at least one stripping gas injector (40) proximate to the lower stripping bed area (29); each separation chamber (2) further comprise a separation chamber outer wall (11) that extends from the separation chamber inlet (27) towards the lower stripping bed area (29) and together with lateral vertical walls (9) and central riser reactor (4) define the separation chamber (2) and a separation chamber outlet (36) at a lower area of the separation chamber (2b) from which the solid particles are evacuated to the lower stripping bed area (29); the reaction vessel (100) further comprises at least one secondary separator (28) in the upper secondary separator area (29a), communicating with the gas outlet collector (18) for receiving the cracked gases and a minor portion of the solid particles, the secondary separator (28) comprises at least one gas evacuation conduit (32) communicating with a gas collector (33) for discharging cracked gases, the gas collector (33) comprises a gas outlet (35) for evacuating the cracked gases from the reaction vessel (100), and at least one dipleg (30) having a dipleg outlet (31) extending into the lower stripping bed area (29) for returning separated solids to the lower stripping bed area (29) of the reaction vessel (100).

Other embodiments disclosed herein are further directed to an apparatus for separating a gaseous mixture from a stream of particles entering from a central riser reactor, a riser reactor where cracking of a hydrocarbon feed takes place with FCC catalyst. The apparatus comprises: a reaction vessel (100) comprising a lower stripping bed area (29), and an upper secondary separator area (29a), a central riser reactor (4) including a central riser reactor inlet (26) at one end for receiving the hydrocarbon feed and stream of particles and at least one central riser reactor outlet (5) at an opposite end for evacuating a mixture of cracked gases and solid particles; a separation vessel (1) comprising in an alternating manner at least one separation chamber (2) and at least one collection chamber (3) distributed axially about the central riser reactor (4) and proximate to the central riser reactor outlet (5) for separating the cracked gases and solid particles; each separation chamber (2) comprises two substantially vertical lateral walls (9) which also comprise a wall of the adjacent collection chambers (3), a separation chamber inlet (27) in an upper area of the separation chamber (2a) communicating with the central riser reactor outlet (5) for receiving the cracked gases and solid particles, a separation chamber deflector (8) arcs away from the longitudinal axis of the central riser reactor (4) towards the lower stripping bed area (29) over which the cracked gases and solid particles pass, the separation chamber deflector (8) being proximate to the separation chamber inlet (27), and at least one of the vertical lateral walls (9) of each chamber comprises a lateral outlet (10) below the separation chamber deflector (8) enabling the cracked gases and a minor portion of the solid particles from the separation chamber (2) to communicate with an adjacent collection chamber (3); said central riser reactor outlet (5) further comprises a riser outlet curved surface (42) that arcs away from the longitudinal axis of the central riser reactor (4) and extends to the separation chamber deflector (8) of each separation chamber (2) to initiate a substantially 180° change in direction of the cracked gases and solid particles evacuating the central riser reactor (4) via the central riser reactor outlet (5) and separation chamber inlet (27) into each separation chamber (2) and a riser outlet cone-shaped concave deflector (20) having a vertex (25) proximal to the center of the central riser reactor outlet (5) and pointing to the central riser reactor inlet (26), starting from the vertex (25) the riser outlet cone-shaped concave deflector (20) arcs away from the longitudinal axis of the central riser reactor (4) extending to and communicating with an upper area (27*a*) of each separation chamber inlet (27) facilitating the change in direction of the cracked gases and solid particles evacuating the central riser reactor; each collection chamber (3) comprises a collection chamber outer wall (14) that includes a stripping gas entrance window (15) to allow a stripping gas to enter the collection chamber (3) from at least one stripping gas injector (40) proximate to the lower stripping bed area (29), a collection chamber floor (16) that together with the collection chamber outer wall (14), the vertical lateral walls (9) and the central riser reactor (4) define the collection chamber (3), and at least one collection chamber conduit (17) in an upper area of the collection chamber (3*a*) for evacuating the cracked gases and a minor portion of the solid particles from the collection chambers (3) to a gas outlet collector (18); each separation chamber (2) further comprises a separation chamber outer wall (11) that extends from the separation chamber inlet (27) towards the lower stripping bed area (29) and together with lateral vertical walls (9) and central riser reactor (4) form a separation chamber outlet (36) at a lower area of the separation chamber (2*b*) communicating with a common catalyst outlet area (37) positioned toroidally around the central riser reactor (4) that comprises a common catalyst area wall (38), the common catalyst area wall (38) extends towards the lower stripping bed area (29) from the separation chamber outer wall (11) proximate to the separation chamber outlet (36) and collection chamber outer wall (14) proximate to the collection chamber wall floor (16) and circumferentially around the central riser reactor (4) to direct solid particles to the lower stripping bed area (29); the reaction vessel (100) further comprises at least one secondary separator (28) in the upper secondary separator area (29*a*), communicating with the gas outlet collector (18) for receiving the cracked gases and a minor portion of the solid particles, the secondary separator (28) comprises at least one gas evacuation conduit (32) communicating with a gas collector (33) for discharging cracked gases, the gas collector (33) comprises a gas outlet (35) for evacuating the cracked gases from the reaction vessel (100), and at least one dipleg (30) having a dipleg outlet (31) extending into the lower stripping bed area (29) for returning separated solids to the lower stripping bed area (29) of the reaction vessel (100).

The methods and apparatus disclosed herein provide improved gas catalyst separation efficiency due to contouring of the central riser rector outlet to provide a complete 180° turn and smoother flow into separation chambers. The smoother flow results in better vapor/catalyst flow patterns and hydraulics (i.e., reduced turbulence, flow pulsations and fluctuations at riser exit) being generated for improved gas solid separation. The new curved riser reactor outlet section and riser outlet cone-shaped concave deflector helps solid particles to flow along the walls of the riser reactor and central riser reactor outlet as it evacuates the riser reactor and allows gas to separate while catalyst is taking a smooth 180° turn.

The claimed apparatus allows for a very compact design, i.e., reduction in size such as 20-25% reduction in diameter and 10-15% reduction in height compared to the prior art. The more compact design of the claimed apparatus can be advantageously used to replace older systems and allow the enclosing vessel to be reused while increasing unit capacity. Further, the compact design reduces post riser residence time, thereby reducing undesired thermal cracking. Utilization of single or multiple baffles with and without holes above the catalyst bed in the common catalyst outlet area, e.g. common catalyst outlet area skirted around the riser reactor, or positioned at various locations on the riser reactor, as presented in the Figures herein. The claimed apparatus reduces momentum of the separated catalyst particles flowing down the walls and redirects them, thereby reducing the potential for re-entrainment of the separated catalyst particles.

The exploitation of multiple separation chambers having an outlet to a common catalyst outlet area to provide essentially a "single dipleg" enables synchronization between all the separation chambers, thereby equalizing pressure drop across each chamber. The common catalyst outlet area, i.e., "single dipleg" balances the flow of the cracked gases and solid catalyst particles (i.e., gas catalyst flow) to each separation chamber inlet from the central riser reactor. Further, the common catalyst outlet area will minimize pressure imbalances and reduces the chances for non-uniformity of gas catalyst flow through each separation chamber inlet.

BRIEF DESCRIPTION OF THE DRAWINGS

The invention will be better understood from the accompanying Figures which schematically illustrate the apparatus and in which.

DETAILED DESCRIPTION OF THE INVENTION

As more fully explained with reference to the Figures herein below, the improved apparatus for separating the cracked hydrocarbon vapor from FCC catalyst comprises a riser separation system that provides gas-solids separation efficiency, gas containment and stability of operation. The claimed apparatus provides rapid and improved gas catalyst separation and enhanced gas collection efficiency, however, as the separation vessel can be made smaller, residence time is reduced and undesired post riser thermal cracking is reduced providing additional performance benefits.

As more fully described below in one embodiment the claimed apparatus has a unique contouring of the central riser reactor outlet utilizing a smooth 180° transition for the cracked gases and solid particles that minimizes the turbulent flow regime in the central riser reactor outlet. Additional embodiments of the riser separation system include multiple collection chambers in conjunction with separation chambers and baffles in the dipleg.

The plurality of separation and collection chambers, e.g., two separation and two collection chambers in the separation vessel with a common catalyst outlet area/discharge area, i.e., a "single dipleg," provides a smaller sized separation vessel (diameter and length) and lower volume of the separation vessel reduces post riser residence time. Moreover, the claimed apparatus provides improved operational stability by reducing the turbulence in the central riser reactor outlet. The plurality of separation chambers connected to the "single dipleg" provides synchronization between all separation chamber inlets and the single dipleg. Further, the common discharge outlet area minimizes pressure imbalances within the separation vessel and reduces the potential for gas catalyst flow mal-distribution through each central riser reactor outlet, which are in fluid communication with the separation chamber inlets.

In the Figures, the same reference numerals indicate the same apparatus components.

The embodiments disclosed herein are particularly intended for separating effluents at the outlet from hydrocarbon cracking processes including but not limited to thermal regenerative cracking (TRC) or fluidized catalytic cracking (FCC) from a hydrocarbon feedstock (oil) that is cracked in the presence of a hot catalytic particulate solids, typically a silica-alumina based catalyst, generally containing zeolites as an additive.

Figure 1:
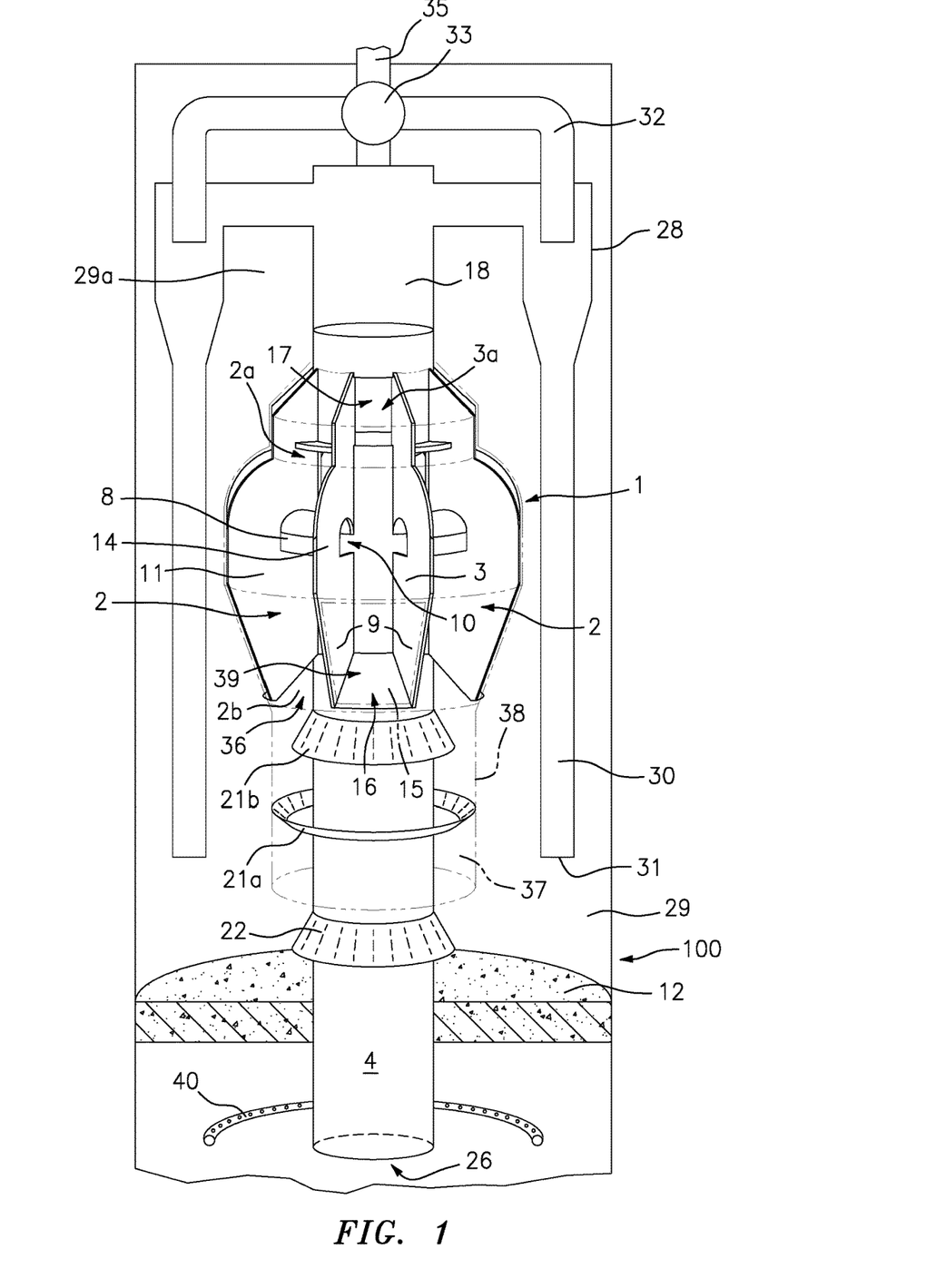
FIG. 1 is a perspective view into the collection chamber of the separation vessel within the reaction vessel, a riser separation system having multiple separation chambers with common catalyst outlet/discharge area, i.e. common dipleg or single dipleg.

FIG. 1 illustrates an embodiment of the apparatus for separating a gaseous mixture from a stream of particles entering from a central riser reactor of the FCC reactor section. According to this embodiment reaction vessel (100) comprises a lower stripping bed area (29), a central riser reactor (4) having a central riser reactor inlet (26) at one end for receiving the hydrocarbon feed and stream of particles, for example, a fluidizable powder, such as a typical FCC catalyst, and at least one central riser reactor outlet (5) at an opposite end for evacuating a mixture of cracked gases and solid particles. At least one central riser reactor outlet (5) is formed in the upper end of the central riser reactor (4) just below the apex of the central riser reactor (4).

The central riser reactor (4) of FIG. 1 preferably has an elongate form that is substantially vertical, the bottom of which is equipped for receiving hot regenerated catalyst from a regenerator (or other particulates), nozzles for feeding an atomized hydrocarbon feedstock to the riser (or other means for introducing a feedstock to the riser reactor) and optionally a lift gas.

The diameter of the central riser reactor (4) ranges from about 1 inch to about 10 feet and larger, and in another embodiment ranges from about 3 feet to about 6 feet.

The reaction vessel (100) comprises a separation vessel (1). The riser termination device (RTD), i.e., separation vessel (1) contains at least one or a plurality of separation chambers (2) and at least one or a plurality of collection chambers (3). According to an embodiment the separation vessel (1) comprises four separation chambers (2) and four collection chambers (3), however, there can be more, or less, than four of each depending on the requirements of the reaction vessel (100).

In particular, the separation chambers (2) and collection chambers (3) are distributed axially about the central riser reactor (4) and proximate to the central riser reactor outlet (5) in an alternating manner, i.e., a separation chamber (2) is next to a collection chamber (3), such that each separation chamber (2) has a collection chamber (3) on each side and each collection chamber (3) has a separation chamber (2) on each side.

In FIG. 1 it can be seen that each separation chamber (2) has two substantially vertical lateral walls (9), and each lateral wall (9) is a wall of the adjacent collection chambers (3). Thus, the separation chambers (2) and collection chambers (3) share the vertical lateral walls (9). Each separation chamber (2) has a separation chamber inlet (27) in an upper area of the separation chamber (2a) that defines an area proximate to and in fluid communication with the central riser reactor outlet (5). The separation chamber inlet (27) defines an area of the separation chamber (2) for entrance of the cracked gases and solid particles. The separation chambers (2) also contains a separation chamber deflector (8) over which the cracked gases and solid particles, e.g., spent catalyst, pass. The separation chamber deflector (8) is a conventional deflector that would be used in apparatus for hydrocarbon cracking and is located proximate to the bottom of the area defined by the separation chamber inlet (27). The central riser reactor outlet (5) is formed in an area at the end of the central rise reactor (4) distal to the central riser reactor inlet (26) and provides an outlet for cracked gases and solid particles from the central riser reactor (4) and is in fluid communication with the separation chamber inlet (27). The separation chamber inlet (27), can be, for example, an opening in the wall of the central riser reactor (4) that communicates with the central riser reactor outlet (5).

The vertical lateral walls (9) of each chamber has a lateral outlet (10), i.e., an opening or window, below the separation chamber deflector (8). The lateral outlet (1) enables the cracked gases and a minor portion of the solid particles, e.g. spent catalyst, from the separation chamber (2) to communicate with an adjacent collection chamber (3).

As illustrated in FIG. 1, the collection chambers (3) have a collection chamber outer wall (14) that includes a stripping gas entrance window (15). The stripping gas entrance window (15) allows stripping gas from at least one stripping gas injector (40) located in the lower stripping bed area (29), usually below a stripper bed (12) to enter the collection chamber (3). Further, each collection chamber (3) has a collection chamber floor (16) that together with the collection chamber outer wall (14), the vertical lateral walls (9) and the central riser reactor (4) define the collection chamber (3).

Additionally, each collection chamber (3) has at least one collection chamber conduit (17) in an upper area of the collection chamber (3a) for evacuating the cracked gases and a minor portion of the entrained solid particles from the collection chambers (3) to a gas outlet collector (18). The collection chamber conduit (17), can be, for example, an opening in the wall of the central riser reactor (4) that communicates with the gas outlet collector (18).

In FIG. 1, the reaction vessel (100) has at least one secondary separator (28) in an upper secondary separator area (29a) of the reaction vessel (100) communicating with the gas outlet collector (18). The secondary separator (28) receives cracked gases and a minor amount of entrained solid particles from the gas outlet collector (18). Further the secondary separator (28) contains at least one gas evacuation conduit (32) for discharging cracked gases and at least one dipleg (30) and a dipleg outlet (31). The dipleg (30) returns separated solid particles to the lower stripping bed area (29) of the reaction vessel (100). The gas evacuation conduit (32) is in fluid communication with a gas collector (33) that has a gas outlet (35) that evacuates the cracked gas from the reaction vessel (100).

Alternatively, the at least one, secondary separator (28) can be external (not shown), to the reaction vessel (100) and receives cracked gases and a minor amount of entrained solid particles from the gas outlet collector (18). The external secondary separator (28) comprises at least one gas evacuation conduit (32) for discharging the cracked gases for further processing. The external secondary separator (28) further comprises at least one dipleg (30) having a dipleg outlet (31) extending into the reaction vessel (100) through a port (not shown) in the reaction vessel (100) for returning separated solid particles to the lower stripping bed area (29) of the reaction vessel (100).

The separation chambers (2) have separation chamber outer walls (11) that extend from the top of the area defined by the separation chamber inlet (27) towards the lower stripping bed area (29) and together with lateral vertical walls (9) and central riser reactor (4) form a separation chamber outlet (36) at the lower area of the separation chamber (2b). The separation chamber outlet (36) communicates with a common catalyst outlet area (37) that is positioned toroidally around the central riser reactor (4).

The cracked gases and solid particles evacuate the central riser reactor (4) via the central reactor riser outlet (5), which is in fluid communication with the separation chamber inlet (27). As the cracked gases and solid particles enter the separation chamber (2) the cracked gas and solid particles are separated by the centrifugal flow pattern over the separation chamber deflector (8). There is an inertial effect exerted on the solid particles due to the change in the direction of flow during passage in the upper portion of the separation chamber (2). The flow change of the cracked gas and catalyst particles is effected by its entrance into the separation chamber (2) and movement over the separation chamber deflector (8).

Figure 4A:
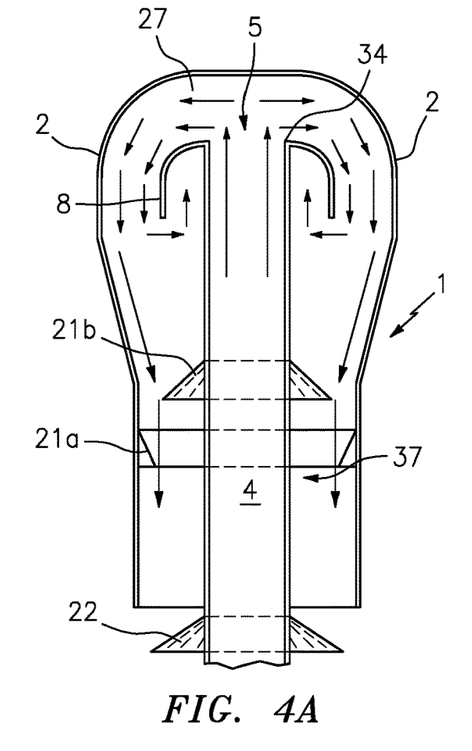
FIG. 4A is a cross-sectional view of the separation vessel illustrating a 90° central riser reactor outlet distributing cracked gases and solid particles into two separation chambers with common catalyst outlet/discharge area, i.e. common dipleg or single dipleg.

In an embodiment, the riser reactor effluent, i.e., cracked gases and solid particles travel up the central riser reactor (4) having a substantially flat vertical wall and evacuate the central riser reactor outlet (5) at about a 90° angle (34) over separation chamber deflector (8) proximate to the separation chamber inlet (27), see for example FIG. 4A. The cracked gases and solid particles initiate separation as they encounter the separation chamber deflector (8) and separation chamber outer wall (11) that curves towards the lower stripping bed area (29).

In FIG. 1 it can be noted that the common catalyst outlet area (37) comprises a common catalyst area wall (38) that extends from the separation chamber outer wall (11) where the separation chamber outlet (36) begins and from collection chamber outer wall (14) where it meets the collection chamber floor (16) towards the lower stripping bed area (29). The common catalyst area wall (38) also extends circumferentially around the central riser reactor (4), thus encompassing the common catalyst outlet area (37). In essence, the common catalyst area wall (38) extends from the separation chamber outer wall (11) and from the collection chamber floor (16) in a circular manner around the central riser reactor (4). Thus, the solid particles from each of the separation chamber outlets (36) are distributed into the common catalyst outlet area (37), which acts as a "single dipleg" for discharging the solid particles to the stripper bed (12) in the lower stripping bed area (29).

In this manner, the majority of the solid phase, which entrains small quantities of hydrocarbon vapors, flows from each separation chamber (2) via common catalyst outlet area (37) to the lower stripping bed area (29). Thus, the separation chamber outlets (36) communicate with each other below the collection chamber floor (16) and within the common catalyst outlet area (37).

In order to intimately contact the separated catalyst (i.e., solid particle) with the stripping gas in the common catalyst outlet area (37) above the catalyst stripper bed (12) and lower stripping bed area (29), a dipleg deflector(s) (22) fashioned around the riser rector (4) below the dipleg outlet opening can be used to intensify mixing of stripping gas with solid particles flowing down from the separation chambers (2) into the common catalyst outlet area (37), i.e., single dipleg. Additionally, single or multiple baffles (21a and/or 21b) or baffles with and without holes, attached to the riser reactor (4) and/or the common catalyst area wall (38) can be used above the catalyst bed in the dipleg section to reduce re-entrainment of catalyst from the bed catalyst bed below. Specifically the baffles (21a and/or 21b) in the claimed apparatus deflects momentum of the separated catalyst flowing down the walls and redirect them, thereby reducing the potential for re-entrainment of the separated catalyst particles. The inventors contemplate the claimed apparatus to include dipleg deflectors and/or baffles of various types and being located in optimal positions to provide the above-mentioned benefits.

Stripping gas injectors (40) for introducing a stripping gas, such as, but not limited to, nitrogen or steam or fuel gas or light hydrocarbon vapors to encourage desorption of the liquid or gaseous hydrocarbons contained inside the pores of the catalyst grains are located beneath the baffle means (21a and/or 21b) or dipleg deflector (22) and beneath the common catalyst outlet area (37), as well as the stripper bed (12). The stripping gas injectors (40) for introducing a stripping gas are not limited and can be any gas injection device known in the art.

If the apparatus is used in a process, such as an FCC cracking of a vacuum gas oil (other hydrocarbonaceous feedstocks are of course contemplated for use in the present invention, such as but not limited to naphtha, atmospheric gas oils, cycle oils and resids, as are well known to those of skill in the art) the period of residence time in the central riser reactor (4) ranges from about 0.1 to about 10 seconds, and in another embodiment, ranges from about 1.5 to about 2.5 seconds.

According to an embodiment, the riser outlet temperature may range from about 900° F. to about 1090° F. and higher, and in another embodiment ranges from about 950° F. to about 1050° F. In an embodiment the pressure in the central riser reactor (4) ranges from about few psig (pound-force per square inch gauge) to about 30 psig and higher, and in another embodiment ranges from about 10 psig to about 30 psig. Typically, the pressure in a fluid catalytic cracking central riser reactor (4) ranges between 15 psig and 35 psig, with 25 psig being a typical pressure.

Figure 2:
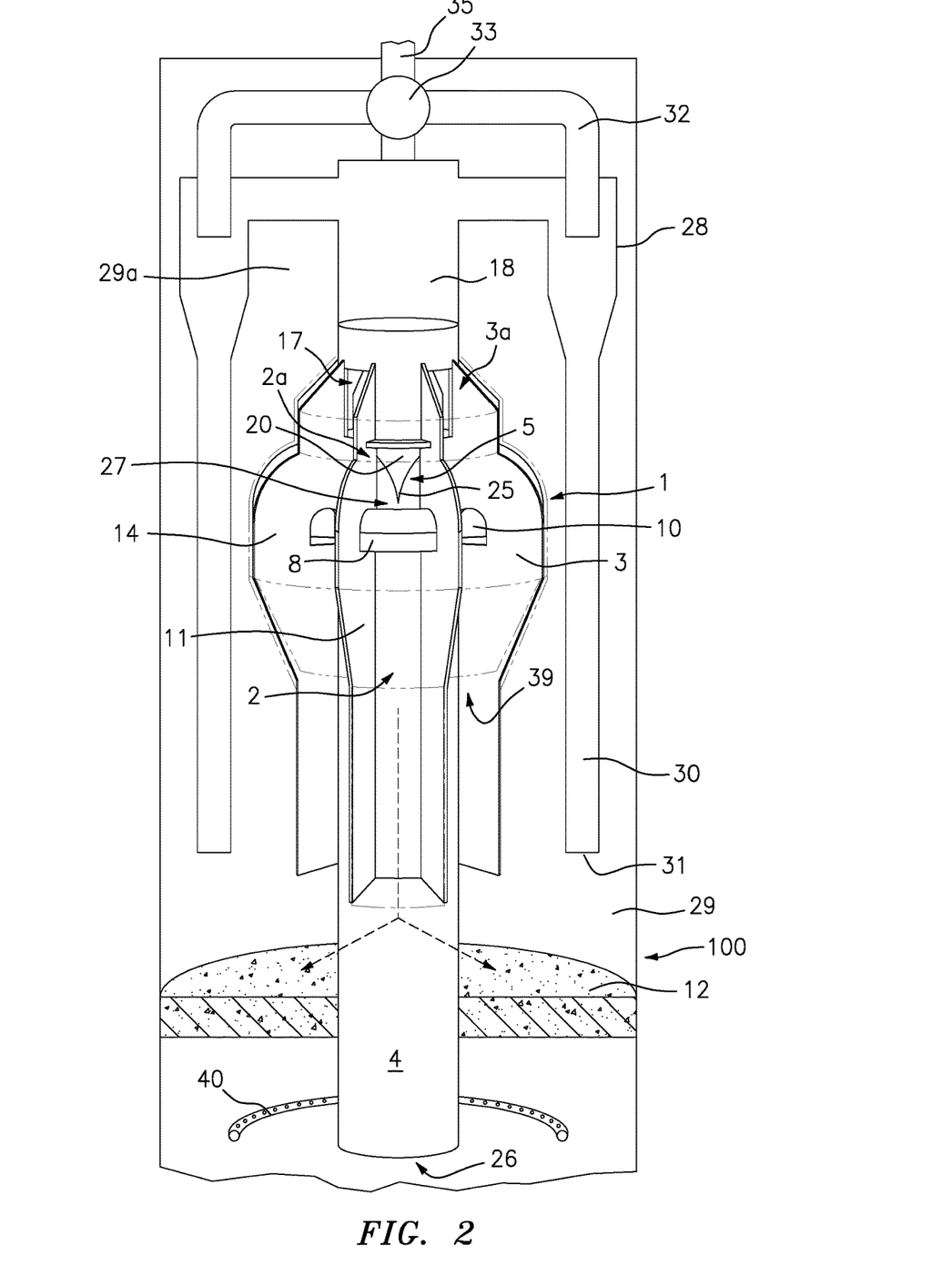
FIG. 2. is a perspective view into the separation chamber of the separation vessel within the reaction vessel, a riser separation system having a riser outlet curved surface, separation chamber deflector and a riser outlet cone-shaped concave deflector, with each separation chamber having a separate dipleg with or without the baffles.

FIG. 2 illustrates an embodiment of the apparatus for separating a gaseous mixture and a stream of particles from a central riser reactor for cracking a hydrocarbon feed. More particularly, FIG. 2 presents an embodiment wherein the central riser reactor outlet (5) comprises a riser outlet cone-shaped concave deflector (20) and a riser outlet curved surface (42) that arcs away from the longitudinal axis of the central riser reactor (4) and extends to and communicates with the separation chamber deflector (8) of each separation chamber (2). Together, the riser outlet curved surface (42), riser outlet cone-shaped concave deflector (20), curved shape of the separation chamber outer wall (11) and the separation chamber deflector (8) provide a unique substantially 180° contouring from within the central riser reactor (4) into each of the separation chambers (2).

The riser outlet curved surface (42) (see, for example FIG. 4C) initiates a substantially 180° change in the direction of the cracked gases and solid particles from within the central riser reactor (4). The separation chamber deflector (8) curves towards the lower stripping bed area (29) and together with the riser outlet curved surface (42) completes a substantially 180° change in direction of the cracked gases and solid particles. The unique contouring provides a smooth 180° turn for the cracked gases and solid particles into each separation chamber (2) and minimizing the flow turbulence at the central riser reactor outlet (5).

The riser outlet cone-shaped concave deflector (20) is located in the center of the central riser reactor outlet (5) and the vertex (25) of the riser outlet cone-shaped concave deflector (20) points down the central riser reactor (4) towards the central riser reactor inlet (26). The appearance characteristics of the riser outlet cone-shaped concave deflector (20) is illustrated in FIG. 2 as arching away from the vertex (25) and the longitudinal axis of the central riser reactor (4) and the central riser reactor inlet (26). The riser outlet cone-shaped concave deflector (20) extends to the upper area (27a) of each separation chamber inlet (27) to facilitate the change in direction and flow of the cracked gases and solid particles evacuating the central riser reactor (4) while they are still in the central riser reactor outlet (5). Not being limited, other central riser reactor outlet (5) deflector shapes are contemplated for facilitating the change in direction and flow of the cracked gases and solid particles out of the central riser reactor outlet (5), so long as the shape minimizes the turbulent flow regime within the central riser reactor outlet (5). Central riser reactor outlet (5) deflector shape is torroidal, however other smooth surfaces can be used. For example, non-limiting shapes include a profile that is elliptical and rotated, a flattened torus, as well as the angular shapes triangular, pentagonal, or hexagonal pyramid shapes that facilitate the uniform flow of gases and solid particles from the central riser reactor outlet (5) to the separation chamber inlet (27).

Similar to FIG. 1, FIG. 2 presents the reaction vessel (100) having a lower stripping bed area (29), an upper secondary separator area (29a), a central riser reactor (4) including a central riser reactor inlet (26) at one end for receiving the hydrocarbon feed and stream of particles and at least one central riser reactor outlet (5) at an opposite end for evacuating a mixture of cracked gases and solid particles.

In FIG. 2 the riser termination device (RTD), i.e., separation vessel (1) has separation chambers (2) and collection chambers (3) distributed in an alternating manner axially about the central riser reactor (4) and proximate to the central riser reactor outlet (5). Another embodiment of the apparatus illustrated in FIG. 2 is a stripping gas inlet (39) that is distal to the collection chamber conduit (17), which allows stripping gas to enter the stripping chamber (3). The stripping gas inlet (39) is formed by the collection chamber outer wall (14) which extends from the collection chamber conduit (17) and together with the vertical lateral walls (9) and the central riser reactor (4) define the stripping gas inlet (39). Stripping gas is provided by the stripping gas injector (s) (40) located in the lower stripping bed area (29).

As in FIG. 1 the separation chamber deflector (8) of FIG. 2 is located proximate to the bottom of the area defined by the separation chamber inlet (27) and extends towards the lower stripping bed area (29). The vertical lateral walls (9) of each chamber has a lateral outlet (10) below the separation chamber deflector (8) enabling the cracked gases and a minor portion of the solid particles from the separation chamber (2) to communicate with an adjacent collection chamber (3). Each collection chamber (3) has at least one collection chamber conduit (17) in an upper area of the collection chamber (3a) communicating with a gas outlet collector (18). Cracked gases and a minor portion of the solid particles are evacuated from the collection chambers (3) to the gas outlet collector (18).

In FIG. 2 each separation chamber (2) further comprise a separation chamber outer wall (11) that extends from the separation chamber inlet (27) towards the lower stripping bed area (29) and together with lateral vertical walls (9) and central riser reactor (4) form a separation chamber outlet (36) at a lower area of the separation chamber (2b) distal to the stripping gas inlet (39) from which the solid particles are evacuated to the lower stripping bed area (29). Thus, the separation vessel (1) of FIG. 2 comprises multiple diplegs, since each separation chamber (2) provides a dipleg to evacuate solid particles to the lower stripping bed area (29) and stripper bed (12). The embodiments presented in FIG. 2 include at least one secondary separator (28) in an upper secondary separator area (29a) of the reaction vessel (100) communicating with the gas outlet collector (18). The secondary separator (28) receives cracked gases and a minor portion of the entrained solid particles from the gas outlet collector (18). Further the secondary separator (28) contains at least one gas evacuation conduit (32) for discharging cracked gases and at least one dipleg (30) and a dipleg outlet (31). The dipleg (30) returns separated solid particles to the lower stripping bed area (29) of the reaction vessel (100). The gas evacuation conduit (32) is in fluid communication with a gas collector (33) that has a gas outlet (35) that evacuates the cracked gas from the reaction vessel (100).

As more fully described above, the at least one secondary separator (28) can be external (not shown) to the reaction vessel (100) at least one dipleg (30) with a dipleg outlet (31) extending into the reaction vessel (100) through a port (not shown) in the reaction vessel (100) for returning separated solid particles to the lower stripping bed area (29) of the reaction vessel (100).

Figure 3:
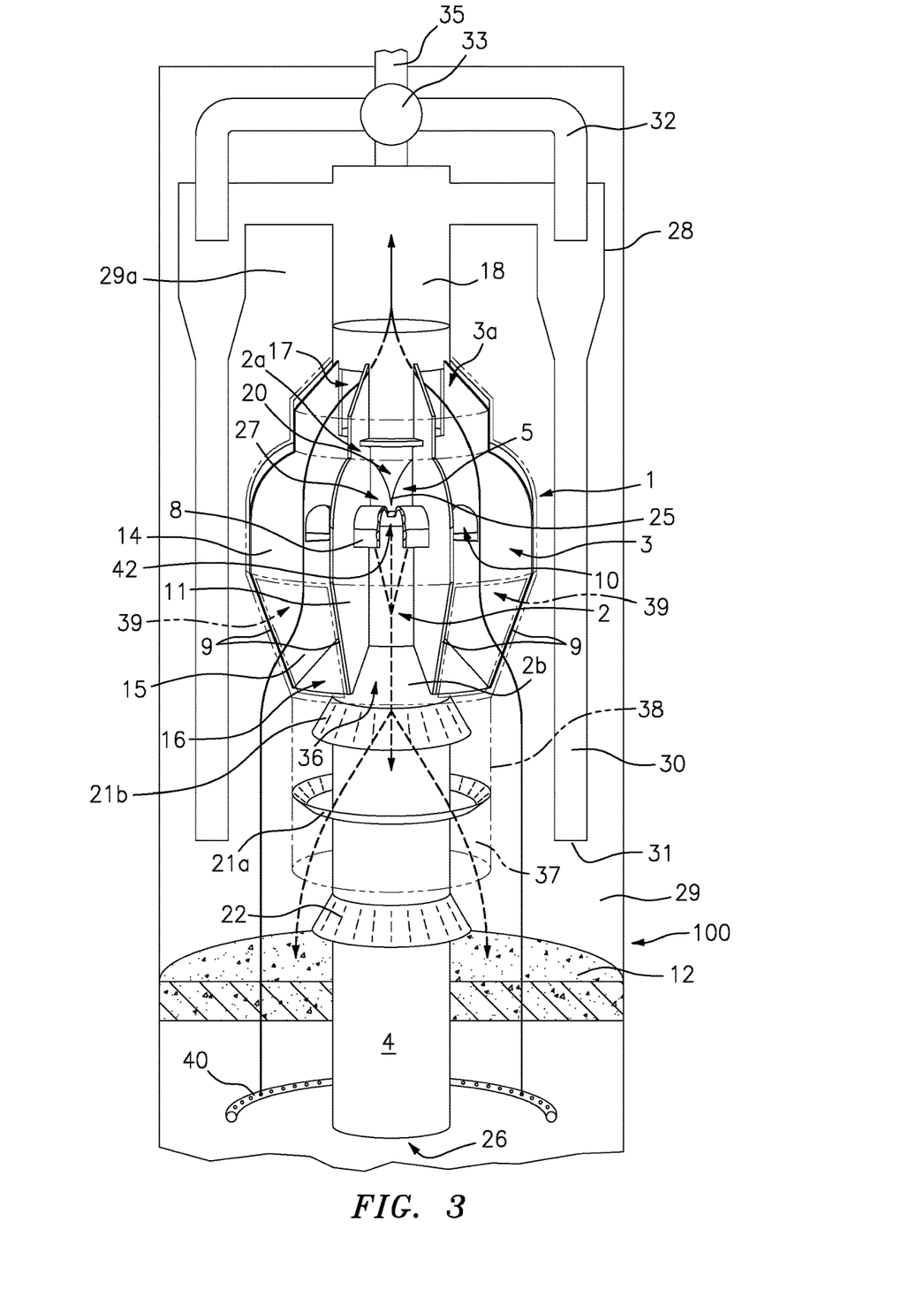
FIG. 3 is a perspective view into the separation chamber of the separation vessel within the reaction vessel, a riser separation system having a riser outlet curved surface, separation chamber deflector and a riser outlet cone-shaped concave deflector, and multiple separation chambers with common catalyst outlet/discharge area, i.e. common dipleg or single dipleg.

FIG. 3 illustrates the apparatus for separating a gaseous mixture and a stream of particles from a central riser reactor wherein the reaction vessel (100) comprising a lower stripping bed area (29) and an upper secondary separator area (29a). The central riser reactor (4) includes a central riser reactor inlet (26) at one end for receiving the hydrocarbon feed and stream of particles and at least one central riser reactor outlet (5) at an opposite end for evacuating a mixture of cracked gases and solid particles. The riser termination device (RTD), i.e., separation vessel (1) in an alternating manner places the at least one separation chamber (2) and at least one collection chamber (3) axially about the central riser reactor (4) and proximate to the central riser reactor outlet (5).

The FIG. 3 central riser reactor outlet (5) has the riser outlet curved surface (42) that arcs away from the longitudinal axis of the central riser reactor (4) and extends to and communicates with the separation chamber deflector (8) of each separation chamber (2) to initiate a substantially 180° change in direction of the cracked gases and solid particles. The separation chamber deflector (8) curves towards the lower stripping bed area (29) and together with the riser outlet curved surface (42) complete 180° change in direction of the cracked gases and solid particles.

The central riser reactor outlet (5) in FIG. 3 also contains a riser outlet cone-shaped concave deflector (20) having a vertex (25). The riser outlet cone-shaped concave deflector (20) is located in the center of the central riser reactor outlet (5) and the vertex (25) of the riser outlet cone-shaped concave deflector (20) points down the central riser reactor (4) towards the central riser reactor inlet (26). As more fully described above, the riser outlet curved surface (42), riser outlet cone-shaped concave deflector (20), curved shape of the separation chamber outer wall (11) and the separation chamber defector (8) provide a unique substantially 180° contouring from within the central riser reactor (4) into each of the separation chambers (2).

In FIG. 3 the riser outlet cone-shaped concave deflector (20) arches away from the vertex (25) and the longitudinal axis of the central riser reactor (4) and the central riser reactor inlet (26). The riser outlet cone-shaped concave deflector (20) extends to the upper area (27a) of each separation chamber inlet (27) to facilitate the change in direction and flow of the cracked gases and solid particles evacuating the central riser reactor (4) while they are still in the central riser reactor outlet.

Similar to FIG. 1 and FIG. 2, the separation chambers (2) of FIG. 3 have two substantially vertical lateral walls (9) which also are the walls of the adjacent collection chambers (3). At least one of each chamber wall (9) has at least one lateral outlet (10) below the separation chamber deflector (8) enabling the cracked gases and a minor portion of the solid particles from the separation chamber (2) to communicate with an adjacent collection chamber (3). Each separation chamber (2) has a separation chamber inlet (27) in the upper area of the separation chambers (2a) communicating with the central riser reactor outlets (5) for receiving the cracked gases and solid particles.

In FIG. 3 each collection chamber (3) has a collection chamber outer wall (14) that includes a stripping gas entrance window (15) to allow a stripping gas to enter the collection chamber (3). The stripping gas is provided by at least one stripping gas injector (40) proximate to the lower stripping bed area (29). The collection chamber floor (16) together with the collection chamber outer wall (14), the vertical lateral walls (9) and the central riser reactor (4) define the collection chamber (3). The collection chambers (3) have at least one collection chamber conduit (17) in an upper area of the collection chamber (3a) for evacuating the cracked gases and a minor portion of the solid particles to a gas outlet collector (18).

In FIG. 3 each separation chamber (2) has a separation chamber outer wall (11) that extends from the separation chamber inlet (27) towards the lower stripping bed area (29) and together with lateral vertical walls (9) and central riser reactor (4) form a separation chamber outlet (36) at a lower area of the separation chamber (2b) distal to the separation chamber inlet (27) and communicating with a common catalyst outlet area (37). The common catalyst outlet area (37), i.e., discharge outlet, is positioned toroidally around the central riser reactor (4) and the common catalyst outlet area (37) has a common catalyst area wall (38).

In FIG. 1 and FIG. 3 the common catalyst area wall (38) extends towards the lower stripping bed area (29) from the separation chamber outer wall (11) proximate to the separation chamber outlet (36) and collection chamber outer wall (14) proximate to the collection chamber wall floor (16) and circumferentially around the central riser reactor (4). The common catalyst area wall (38) defines the area of the common catalyst outlet area (37) to direct solid particles to the lower stripping bed area (29). As noted in the embodiments of FIG. 1 the solid particles from each of the separation chamber outlets (36) are distributed into the common catalyst outlet area (37), which acts as a "single dipleg" for discharging the solid particles to the stripper bed (12) in the lower stripping bed area (29).

The plurality of separation chambers (2) having an outlet to a common catalyst outlet area (37) that essentially provides the single dipleg balances the flow of the cracked gases and solid catalyst particles between each separation chamber inlet (27) from the central riser reactor outlet (5).

In FIG. 3 the reaction vessel (100) further comprises at least one secondary separator (28) in the upper secondary separator area (29a) communicating with the gas outlet collector (18) for receiving the cracked gases and a minor portion of the solid particles. The secondary separator (28) has at least one gas evacuation conduit (32) communicating with a gas collector (33) for discharging cracked gases. The gas collector (33) comprises a gas outlet (35) for evacuating the cracked gases from the reaction vessel (100). The secondary separator (28) also has at least one dipleg (30) having a dipleg outlet (31) extending into the lower stripping bed area (29) for returning separated solids to the lower stripping bed area (29) of the reaction vessel (100).

As previously mentioned the secondary separator (28) can be external with the appropriate to the reaction vessel (100) in connection with appropriate means for further processing of the cracked gases and separation of the solid particles.

FIG. 4A is a cross-sectional view of the separation vessel (1) illustrating the central riser reactor outlet (5) distributing cracked gases and solid particles into two separation chambers (2). The cracked gases and solid particles enter the separation chamber (2) via the central riser reactor outlet (5) which is in communication with the separation chamber inlet (27) and pass over the separation chamber deflector (8). The cracked gases and solid particles exit the central riser reactor (4) from the central riser reactor outlet (5) at a 90° angle (34). As the cracked gases and solid particles enter the separation chamber inlet (27) the cracked gases and solid particles turn down towards the common catalyst outlet area (37), optionally over a baffle(s) (21a and/or 21b) or baffles with holes, or a dipleg deflector (22) to reduce re-entrainment of catalyst from below on their way to the lower stripping bed area (29) (not shown). Additionally, FIG. 4A provides a cross-sectional view of the central riser reactor outlet (5) and in this embodiment the central riser reactor outlet (5) terminates at an a end of the central riser reactor (4) opposite the central rise reactor inlet (26). The central riser reactor outlet (5) in FIG. 4A comprises the area that "caps" or ends the central riser reactor (4) with a surface (i.e., a material that would similar to, or the same as the central riser reactor (4)) that is perpendicular to the flow cracked gases and solid particles. The central riser reactor outlet (5) is in fluid communication with each separation chamber (27).

Figure 4B:
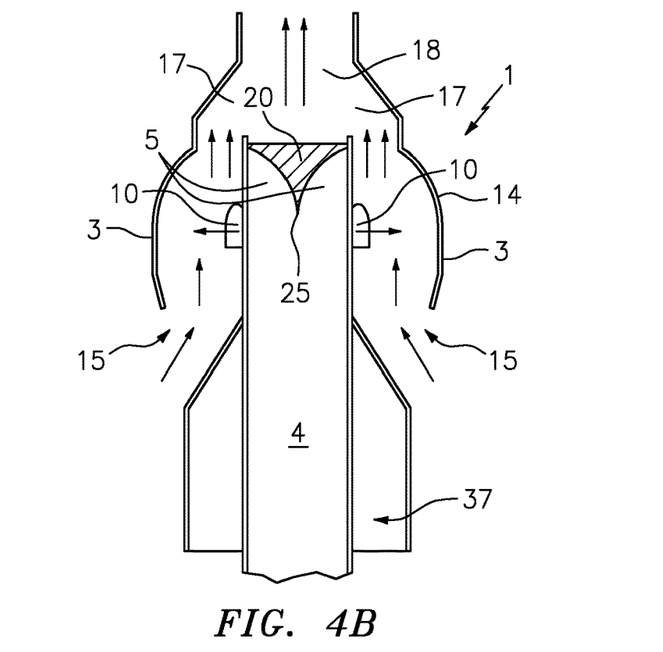
FIG. 4B is a cross-sectional view of the separation vessel illustrating the distribution and evacuation of cracked gases and a small portion of catalyst entering into two collection chambers from lateral outlets of the separation chambers and stripping gas entering stripping gas entrance windows of the collection chambers.

FIG. 4B is a cross-sectional view of the separation vessel (1) illustrating the distribution of cracked gases and solid particles into two collection chambers (3) from lateral outlets (10) and stripping gas entering stripping gas entrance windows (15) of the collection chambers (3) and gases and a portion of solid particles entering the gas outlet collector (18). The common catalyst outlet area (37) that forms the single dipleg directs the solid particles to the lower stripping bed area (29). Additionally, FIG. 4B provides a cross-sectional view of the central riser reactor outlet (5) and in this embodiment the central riser reactor outlet (5) comprises a riser outlet cone-shaped concave deflector (20), with vertex (25). The riser outlet cone-shaped concave deflector (20) extends to and is in fluid communication with each separation chamber inlet (27) (not shown) to provide a smooth 180° turn. As such, the riser outlet cone-shaped concave deflector (20) improves turbulence of the cracked gases and solid particle flow that is created in the central riser reactor outlet (5) when the central riser reactor outlet (5) is "capped," or ends with a flat perpendicular surface as presented in FIG. 4A.

Figure 4C:
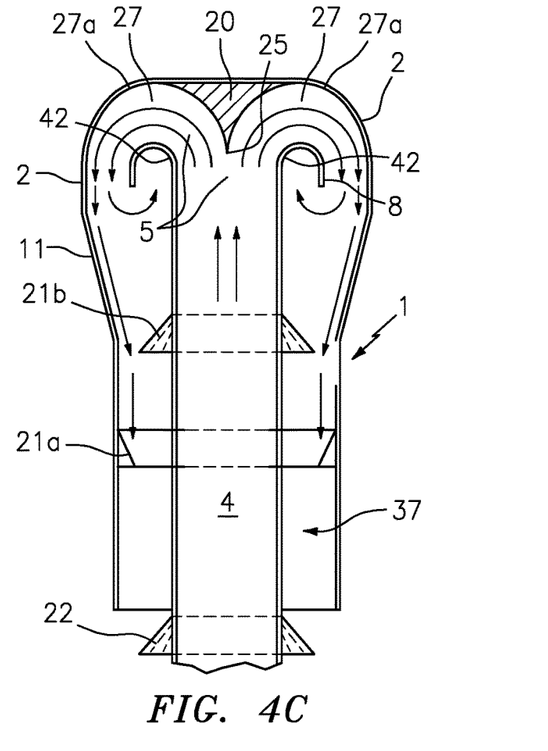
FIG. 4C is a cross-sectional view of the separation vessel illustrating the central riser reactor outlet having a unique contouring provided by the riser outlet curved surface, separation chamber deflector and riser outlet cone-shaped concave deflector.

FIG. 4C is a cross-sectional view of the separation vessel (1) illustrating the central riser reactor outlet (5) having a riser outlet curved surface (42) (in contrast to FIG. 4A's 90° right angle out of the central riser reactor (5) area) that arcs away from the longitudinal axis of the central riser reactor (4) and extends to the separation chamber deflector (8). In this embodiment, the central riser reactor outlet (5) also comprises a riser outlet cone-shaped concave deflector (20) with a vertex (25) distributing cracked gases and solid particles into the separation chambers (2). The cracked gas and solid particles transition from the central riser reactor in a smooth 180° turn into each separation chamber (2) down to the common catalyst outlet area (37) that forms the single dipleg directs the solid particles to the lower stripping bed area (29).

Prophetic Example

Embodiments of the present invention can be further described with the following prophetic example. Although the simulated example is directed to a specific embodiment, it is not to be viewed as limiting the invention in any specific respect.

Figure 5:
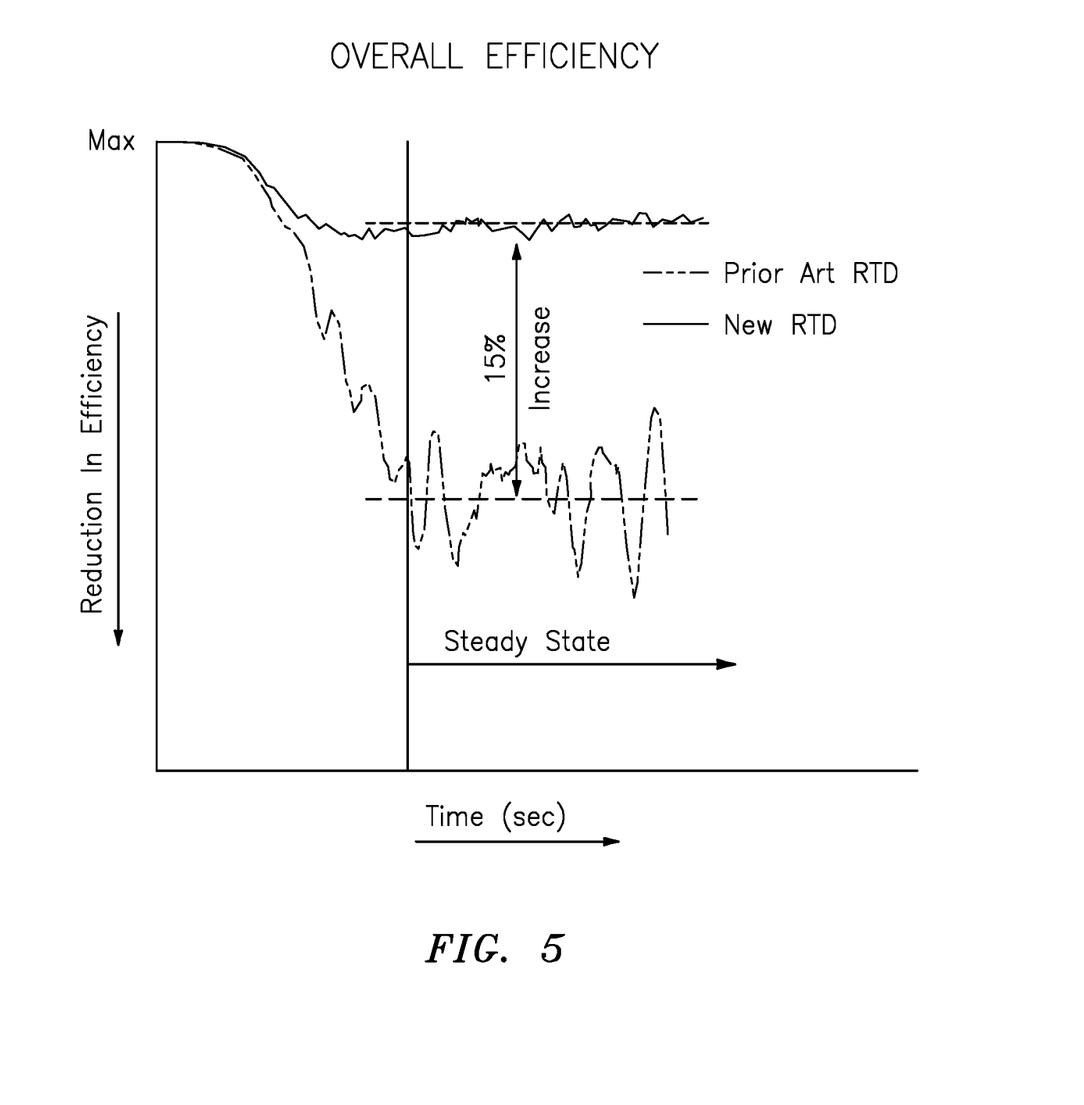
FIG. 5 is a graphical representation of the results of a simulated study using CFD to compare the separation efficiency of a prior art separation vessel with an embodiment of the present invention.

The graph in FIG. 5 represents Computational Fluid Dynamics ("CFD") simulation results. CFD simulations are widely used to simulate gas and/or solids liquid flow fields flow, and is used to model the flow of vapor/catalyst from a riser reactor of a fluid catalytic cracker connected to the separation vessel described herein.

The graph presented in FIG. 5 is a simulated CFD results showing percentage increase in separation efficiency of presently claimed riser separation system (or riser termination device "RTD") of present invention having baffles, contouring at riser top including the riser outlet curved surface that extends to the separation chamber deflector, as well as the riser outlet cone-shaped concave deflector over a prior art riser separation system having a 90° riser outlet discharge Both riser separation systems utilized separation chambers with separate diplegs. Both present and prior art riser separation systems were simulated using same commercial operating conditions. The results clearly show an improvement in vapor catalyst separation efficiency and reduced catalyst flow pulsation with presently claimed riser separation system.

The various embodiments disclosed herein, for example, the "single dipleg," riser outlet cone-shape concave deflector, and riser outlet curved surface can be used separately or in combination in the inventive highly compact riser separation system, i.e., the separation vessel. The riser separation system can utilize a secondary separation system external to the riser separation system, or the riser separation system and the secondary separation system can be contained within a reaction vessel. The riser separation system disclosed herein enables proficient separation efficiency, maximum containment and rapid evacuation of the separated hydrocarbons due to the improved compactness of the equipment.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An apparatus for separating a gaseous mixture from a stream of particles entering from a central riser reactor used for cracking a hydrocarbon feed with said stream of particles, said apparatus comprises:

a reaction vessel comprising a lower stripping bed area and an upper secondary separator area, a central riser reactor including a central riser reactor inlet at one end for receiving the hydrocarbon feed and stream of particles and at least one central riser reactor outlet at an opposite end for evacuating a mixture of cracked gases and solid particles;

a separation vessel comprising in an alternating manner at least one separation chamber and at least one collection chamber distributed axially about the central riser reactor and proximate to the central riser reactor outlet for separating the cracked gases and solid particles;

each separation chamber comprises two substantially vertical lateral walls which also comprise a wall of the adjacent collection chamber, a separation chamber inlet in an upper area of the separation chamber communicating with the central riser reactor outlet for receiving the cracked gases and solid particles, a separation chamber deflector over which the cracked gases and particles pass, the separation chamber deflector being proximate to the separation chamber inlet, and at least one of the vertical lateral walls of each chamber comprises a lateral outlet below the separation chamber deflector enabling the cracked gases and a minor portion of the solid particles from the separation chamber to communicate with an adjacent collection chamber;

each collection chamber comprises a collection chamber outer wall that includes a stripping gas entrance window to allow a stripping gas from at least one stripping gas injector proximate to the lower stripping bed area to enter the collection chamber, a collection chamber floor that together with the collection chamber outer wall, the vertical lateral walls and the central riser reactor define the collection chamber, and at least one collection chamber conduit in an upper area of the collection chamber for evacuating the cracked gases and a minor portion of the solid particles from the collection chambers to a gas outlet collector;

each separation chamber further comprises a separation chamber outer wall that extends from the separation chamber inlet towards the lower stripping bed area and together with lateral vertical walls and central riser reactor form a separation chamber outlet at a lower area of the separation chamber communicating with a common catalyst outlet area positioned toroidally around the central riser reactor, the common catalyst outlet area comprises a common catalyst area wall, the common catalyst area wall extends towards the lower stripping bed area from the separation chamber outer wall proximate to the separation chamber outlet and collection chamber outer wall proximate to the collection chamber wall floor, and in a continuous circumferential direction around the central riser reactor to direct solid particles to the lower stripping bed area;

the reaction vessel further comprises at least one secondary separator in the upper secondary separator area communicating with the gas outlet collector for receiving the cracked gases and a minor portion of the solid particles, the secondary separator comprises at least one gas evacuation conduit communicating with a gas collector for discharging cracked gases, the gas collector comprises a gas outlet for evacuating the cracked gases from the reaction vessel, and at least one dipleg having a dipleg outlet extending into the lower stripping bed area for returning separated solid particles to the lower stripping bed area of the reaction vessel.

2. The apparatus of claim 1, wherein the common catalyst outlet area further comprises at least one baffle and/or at least one deflector.

3. The apparatus of claim 2, wherein the at least one baffle and/or at least one deflector contains holes.

4. The apparatus of claim 1, wherein the at least one secondary separator is external to the reaction vessel and the secondary separator comprises at least one gas evacuation conduit for discharging the cracked gases and at least one dipleg having a dipleg outlet extending into the reaction vessel through a port in the reaction vessel for returning separated solid particles to the lower stripping bed area of the reaction vessel.

5. The apparatus of claim 1, wherein the solid particles are an FCC catalyst.

6. An apparatus for separating a gaseous mixture from a stream of particles entering from a central riser reactor used for cracking a hydrocarbon feed with said stream of particles, said apparatus comprises:

a reaction vessel comprising a lower stripping bed area, and an upper secondary separator area, a central riser reactor including a central riser reactor inlet at one end for receiving the hydrocarbon feed and stream of particles and at least one central riser reactor outlet at an opposite end for evacuating a mixture of cracked gases and solid particles;

a separation vessel comprising in an alternating manner at least one separation chamber and at least one collection chamber distributed axially about the central riser reactor and proximate to the central riser reactor outlet for separating the cracked gases and solid particles; each separation chamber comprises two substantially vertical lateral walls which also comprise a wall of the adjacent collection chambers, a separation chamber inlet in an upper area of the separation chamber communicating with the central riser reactor outlet for receiving the cracked gases and solid particles, a separation chamber deflector arcs away from the longitudinal axis of the central riser reactor towards the lower stripping bed area over which the cracked gases and solid particles pass, the separation chamber deflector being proximate to the separation chamber inlet, and at least one of the vertical lateral walls of each chamber comprises a lateral outlet below the separation chamber deflector enabling the cracked gases and a minor portion of the solid particles from the separation chamber to communicate with an adjacent collection chamber;

said central riser reactor outlet further comprises a riser outlet curved surface that arcs away from the longitudinal axis of the central riser reactor and extends to the separation chamber deflector of each separation chamber to initiate a substantially 180° change in direction of the cracked gases and solid particles evacuating the central riser reactor via the central riser reactor outlet and separation chamber inlet into each separation chamber and a riser outlet cone-shaped concave deflector having a vertex proximal to the center of the central riser reactor outlet and pointing to the central riser reactor inlet, starting from the vertex the riser outlet cone-shaped concave deflector arcs away from the longitudinal axis of the central riser reactor extending to and communicating with an upper area of each separation chamber inlet facilitating the change in direction of the cracked gases and solid particles evacuating the central riser reactor;

each collection chamber comprises at least one collection chamber conduit in an upper area of the collection chamber communicating with a gas outlet collector for evacuating the cracked gases and a minor portion of the solid particles from the collection chambers, and a collection chamber outer wall that extends from the collection chamber conduit and together with the vertical lateral walls and the central riser reactor define a stripping gas inlet to allow a stripping gas to enter the collection chamber from at least one stripping gas injector proximate to the lower stripping bed area;

each separation chamber further comprise a separation chamber outer wall that extends from the separation chamber inlet towards the lower stripping bed area and together with lateral vertical walls and central riser reactor define the separation chamber and a separation chamber outlet at a lower area of the separation chamber from which the solid particles are evacuated to the lower stripping bed area;

the reaction vessel further comprises at least one secondary separator in the upper secondary separator area, communicating with the gas outlet collector for receiving the cracked gases and a minor portion of the solid particles, the secondary separator comprises at least one gas evacuation conduit communicating with a gas collector for discharging cracked gases, the gas collector comprises a gas outlet for evacuating the cracked gases from the reaction vessel, and at least one dipleg having a dipleg outlet extending into the lower stripping bed area for returning separated solids to the lower stripping bed area of the reaction vessel.

7. The apparatus of claim 6, wherein the reactor vessel further comprises at least one baffle and/or deflector above the separation chamber outlet.

8. The apparatus of claim 7, wherein the baffle and/or deflector contains holes.

9. The apparatus of claim 6, wherein the at least one secondary separator is external to the reaction vessel and the secondary separator comprises at least one gas evacuation conduit for discharging the cracked gases and at least one dipleg having a dipleg outlet extending into the reaction vessel through a port in the reaction vessel for returning separated solid particles to the lower stripping bed area of the reaction vessel.

10. The apparatus of claim 6, wherein the solid particles are an FCC catalyst.

11. An apparatus for separating a gaseous mixture from a stream of particles entering from a central riser reactor for cracking a hydrocarbon feed with said stream of particles, said apparatus comprises:
a reaction vessel comprising a lower stripping bed area, and an upper secondary separator area, a central riser reactor including a central riser reactor inlet at one end for receiving the hydrocarbon feed and stream of particles and at least one central riser reactor outlet at an opposite end for evacuating a mixture of cracked gases and solid particles;
a separation vessel comprising in an alternating manner at least one separation chamber and at least one collection chamber distributed axially about the central riser reactor and proximate to the central riser reactor outlet for separating the cracked gases and solid particles; each separation chamber comprises two substantially vertical lateral walls which also comprise a wall of the adjacent collection chamber, a separation chamber inlet in an upper area of the separation chamber communicating with the central riser reactor outlet for receiving the cracked gases and solid particles, a separation chamber deflector arcs away from the longitudinal axis of the central riser reactor towards the lower stripping bed area over which the cracked gases and solid particles pass, the separation chamber deflector being proximate to the separation chamber inlet, and at least one of the vertical lateral walls of each chamber comprises a lateral outlet below the separation chamber deflector enabling the cracked gases and a minor portion of the solid particles from the separation chamber to communicate with an adjacent collection chamber;
said central riser reactor outlet further comprises a riser outlet curved surface that arcs away from the longitudinal axis of the central riser reactor and extends to the separation chamber deflector of each separation chamber to initiate a substantially 180° change in direction of the cracked gases and solid particles evacuating the central riser reactor via the central riser reactor outlet and separation chamber inlet into each separation chamber and a riser outlet cone-shaped concave deflector having a vertex proximal to the center of the central riser reactor outlet and pointing to the central riser reactor inlet, starting from the vertex the riser outlet cone-shaped concave deflector arcs away from the longitudinal axis of the central riser reactor extending to and communicating with an upper area of each separation chamber inlet facilitating the change in direction of the cracked gases and solid particles evacuating the central riser reactor;
each collection chamber comprises a collection chamber outer wall that includes a collection gas entrance window to allow a stripping gas to enter the collection chamber from at least one stripping gas injector proximate to the lower stripping bed area, a collection chamber floor that together with the collection chamber outer wall, the vertical lateral walls and the central riser reactor define the collection chamber, and at least one collection chamber conduit in an upper area of the collection chamber for evacuating the cracked gases and a minor portion of the solid particles from the collection chamber to a gas outlet collector;
each separation chamber further comprises a separation chamber outer wall that extends from the separation chamber inlet towards the lower stripping bed area and together with lateral vertical walls and central riser reactor form a separation chamber outlet at a lower area of the separation chamber communicating with a common catalyst outlet area positioned toroidally around the central riser reactor that comprises a common catalyst area wall, the common catalyst area wall extends towards the lower stripping bed area from the separation chamber outer wall proximate to the separation chamber outlet and collection chamber outer wall proximate to the collection chamber wall floor and circumferentially around the central riser reactor to direct solid particles to the lower stripping bed area;
the reaction vessel further comprises at least one secondary separator in the upper secondary separator area, communicating with the gas outlet collector for receiving the cracked gases and a minor portion of the solid particles, the secondary separator comprises at least one gas evacuation conduit communicating with a gas collector for discharging cracked gases, the gas collector comprises a gas outlet for evacuating the cracked gases from the reaction vessel, and at least one dipleg having a dipleg outlet extending into the lower stripping bed area for returning separated solids to the lower stripping bed area of the reaction vessel.

12. The apparatus of claim 11, wherein the common catalyst outlet area further comprises at least one baffle and/or at least one deflector.

13. The apparatus of claim 12, wherein the at least one baffle and/or at least one deflector contains holes.

14. The apparatus of claim 11, wherein the at least one secondary separator is external to the reaction vessel and the secondary separator comprises at least one gas evacuation conduit for discharging the cracked gases and at least one dipleg having a dipleg outlet extending into the reaction vessel through a port in the reaction vessel for returning separated solid particles to the lower stripping bed area of the reaction vessel.

15. The apparatus of claim 11, wherein the solid particles are an FCC catalyst.

16. The apparatus of claim 1, wherein the gaseous mixture travels through the reactor at a velocity from about 9 to about 26 m/s.

17. The apparatus of claim 1, further comprising a column for fractionating at least one different hydrocarbon cut that is present in the gases that exit the secondary separator.

18. The apparatus of claim 6, wherein each separation chamber extends towards the lower stripping bed area to provide a dipleg from which the solid particles are evacuated to the lower stripping bed area.

19. The apparatus of claim 1, wherein the solid particles are a fluidizable powder.

20. The apparatus of claim 6, wherein the solid particles are a fluidizable powder.

21. The apparatus of claim 11, wherein the solid particles are a fluidizable powder.

22. The apparatus of claim 1, wherein said stripping gas is at least one selected from the group consisting of steam, nitrogen, fuel gas, and hydrocarbon vapors.

23. The apparatus of claim 1, wherein the temperature in the reactor is from about 450° C. to about 750° C.

24. The apparatus of claim 1, wherein the common catalyst area wall extends around the entirety of the circumference of the central riser reactor.

25. The apparatus of claim 1, wherein the common catalyst area wall is a single common catalyst area wall.

* * * * *